(12) United States Patent
Bouchard

(10) Patent No.: US 6,170,831 B1
(45) Date of Patent: Jan. 9, 2001

(54) AXIAL BRUSH SEAL FOR GAS TURBINE ENGINES

(75) Inventor: Joseph P. Bouchard, Arundel, ME (US)

(73) Assignee: United Technologies Corporation, Hartford, CT (US)

( * ) Notice: Under 35 U.S.C. 154(b), the term of this patent shall be extended for 0 days.

(21) Appl. No.: 09/221,289

(22) Filed: Dec. 23, 1998

(51) Int. Cl.[7] .................................................. F16J 15/447
(52) U.S. Cl. ................................................................ 277/355
(58) Field of Search ............................................. 277/355

(56) References Cited

U.S. PATENT DOCUMENTS

| | | |
|---|---|---|
| 4,358,120 | 11/1982 | Moore . |
| 4,553,901 * | 11/1985 | Laurello . |
| 5,114,159 | 5/1992 | Baird et al. . |
| 5,474,305 * | 12/1995 | Flower ................................. 277/355 |
| 5,480,162 | 1/1996 | Beeman, Jr. . |
| 5,498,139 * | 3/1996 | Williams ............................... 277/355 |
| 5,609,469 | 3/1997 | Worley et al. . |
| 5,749,584 | 5/1998 | Skinner et al. . |
| 5,927,721 * | 7/1999 | Schullze et al. ..................... 277/355 |

FOREIGN PATENT DOCUMENTS 0856640    8/1998  (EP) .

* cited by examiner

Primary Examiner—Anthony Knight
Assistant Examiner—Enoch E Peavey
(74) Attorney, Agent, or Firm—McCormick, Paulding & Huber LLP

(57) ABSTRACT

A gas turbine engine includes an axial brush seal extending substantially axially between a vane support and a plurality of blade outer air seals to minimize leakage of cooler air into an air path of working fluid. The axial seal includes a first and a second rings extending axially with a plurality of bristles sandwiched therebetween. Each of the plurality of bristles includes a fore bristle end and an aft bristle end that come into contact with a vane support sealing surface and a blade outer air seal sealing surface, respectively, with the bristles being compressed against the sealing surfaces. The axial seal is movable with respect to the vane support and the blade outer air seals to compensate for expansion and contraction of the vane support and the plurality of blade outer air seals as well as for lack of uniformity in the plurality of blade outer air seals.

17 Claims, 3 Drawing Sheets

AXIAL BRUSH SEAL FOR GAS TURBINE ENGINES

BACKGROUND OF THE INVENTION

1. Technical Field

The present invention relates to gas turbine engines and, more particularly, to a brush seal for minimizing air leakage therein.

2. Background Art

A typical gas turbine engine includes a low compressor, a high compressor, a combustor, a high turbine, and a low turbine sequentially situated about a longitudinal axis. The sections of the gas turbine engine are enclosed in an engine case with air flowing axially through the engine along an annular air path. As is well known in the art, the air enters the low compressor at a substantially ambient temperature and pressure and is compressed by the low and high compressor sections, respectively, to elevate its temperature and pressure. The compressed air is then mixed with fuel, ignited, and burned in the combustor. The hot products of combustion emerging from the combustor are expanded in the high and low turbines, respectively, thereby rotating the turbine and driving the compressor.

The high turbine section of the gas turbine engine is subjected to extremely harsh environment, characterized by very high temperatures and pressures. The components of the high pressure turbine must be cooled to prevent these components from burning in a very short period of time. The cooler air is typically bled from the high pressure compressor and routed to the high pressure turbine. Although the bled cooling air is necessary to cool certain engine parts, loss of the cooling air from the compressor is highly undesirable. The cooling air, diverted from the compressor, is no longer available to produce thrust and thus negatively effects the efficiency of the gas turbine engine. Therefore, the cooling air is carefully routed from the high pressure compressor to the high pressure turbine to ensure that this valuable cooling air is not wasted.

The cooling air is routed through the engine into cooling air compartments that are substantially adjacent to the high pressure turbine air path. The cooling air from the cooling air compartments is carefully metered out to cool various components of the turbine section of the gas turbine engine. However, a barrier is required to prevent the cooling air from escaping from the cooling air compartment into the turbine air path, other than through designated bleeding holes, since the cooling air is at a greater pressure than the air in the turbine air path.

The conventional barriers are annular metal seals which are not completely effective for a number of reasons. First, certain sealing surface which abut these seals are not uniform. For example, a plurality of blade outer air seals forms a segmented ring around the tips of rotating blades. Even slight size differences among the blade outer air seals results in gaps between some of the blade outer air seals and the barrier seals, thereby allowing some of the cooling air to escape therethrough. A second difficulty with effectively sealing the cooling air compartments located in the high pressure turbine of the gas turbine engine is that the high pressure turbine experiences great temperature fluctuations. As a result of these large temperature gradients, the turbine components are subjected to significant thermal expansion. When components of the high pressure turbine expand, the conventional seals cannot adjust and seal the gap between expanded components and the seal, therefore, allowing some of the cooling air to escape through these gaps. Therefore, there is a great need to effectively seal cooling air compartments in the high pressure turbine.

SUMMARY OF THE INVENTION

It is an object of the present invention to minimize leakage of high pressure air into an area of lower pressure air in gas turbine engines.

It is another object of the present invention to provide an air seal that minimizes air leakage between expanding and contracting components of the gas turbine engine and between sealing surfaces that lack uniformity.

According to the present invention, a brush seal for a gas turbine engine includes a first ring and a second ring with a plurality of bristles sandwiched therebetween and extending in an axial direction to minimize high pressure cooling air leakage into an air path of the gas turbine engine. The brush seal extends axially between a vane support and a plurality of blade outer air seals with the bristle tips compressed against a sealing surface of the vane support and against sealing surfaces of the blade outer air seals. The brush seal rests against a plurality of flanges formed on each of the blade outer air seals such that the movement of the brush seal is not significantly restricted. As the vane support and the blade outer air seals move radially and axially as a result of thermal expansion, the axial brush seal maintains contact with both sealing surfaces. Additionally, the axial brush seal compensates for any lack of uniformity in the blade outer air seals by having some of the bristle tips slightly more compressed or slightly less compressed.

Thus, the axial brush seal of the present invention can be used to seal components that do not have a uniform circumferential surface and to compensate for the thermal growth of components in high temperature sections of the gas turbine engine.

According to a feature of the present invention, the brush seal includes a seal lip protruding outward from the first ring of the brush seal for properly orienting the brush seal within the gas turbine engine. The seal lip also provides an additional barrier against air leakage.

One advantage of the present invention is that the seal does not need to be bolted or otherwise fixedly secured, thereby reducing the cost of the seal and reducing assembly time during manufacturing. Also, placing bolts or rivets through the seal degrades the quality of the seal and results in loose bristles that tend to fall out from the seal, thereby reducing effectiveness of the seal.

The foregoing and other advantages of the present invention become more apparent in light of the following detail description of the exemplary embodiments thereof, as illustrated in the accompanying drawings.

DETAILED DESCRIPTION OF THE INVENTION

Figure 1:
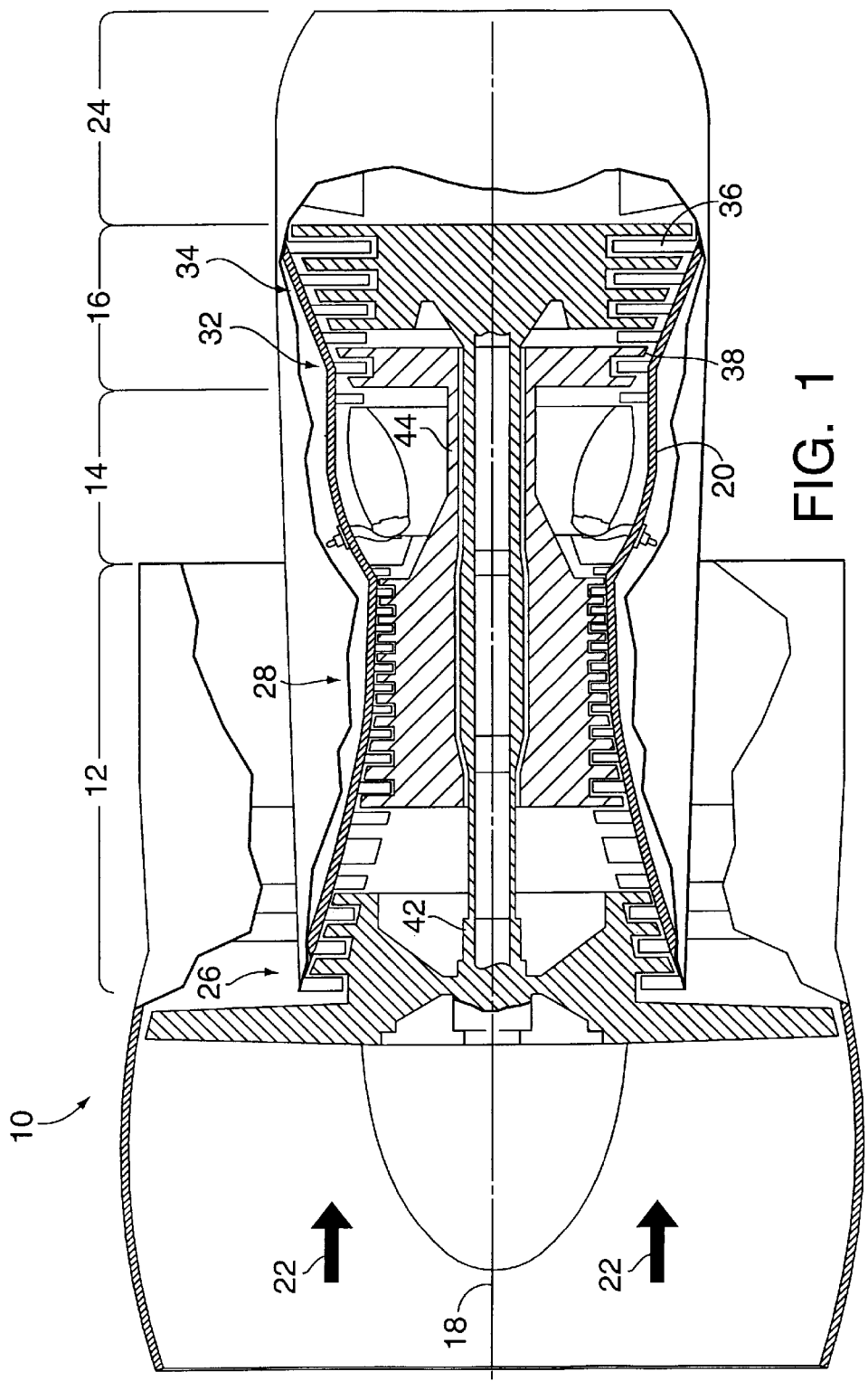
FIG. 1 is a simplified, partially broken away representation of a gas turbine engine.

Referring to FIG. 1, a gas turbine engine 10 includes a compressor 12, a combustor 14, and a turbine 16 sequentially situated about a longitudinal axis 18. A gas turbine engine case 20 encloses sections 12, 14, 16 of the gas turbine engine 10. Air flows substantially axially along an annular air path 22 through the sections 12, 14, 16 of the gas turbine engine 10 and is exhausted through an aft portion 24 of the gas turbine engine 10. The compressor 12 comprises a low compressor section 26 and a high compressor section 28 and the turbine 16 comprises a high turbine section 32 and a low turbine section 34. The compressor 12 and the turbine 16 include alternating rows of stationary vanes 36 and rotating blades 38. The stationary vanes 36 are mounted onto the engine case 20. The rotating blades 38 of the low compressor 26 and low turbine 34 are secured onto a rotating low rotor 42. The rotating blades 38 of the high compressor 28 and high turbine 32 are secured onto a rotating high rotor 44, which is disposed radially outward of the rotating low rotor 42.

Figure 2:
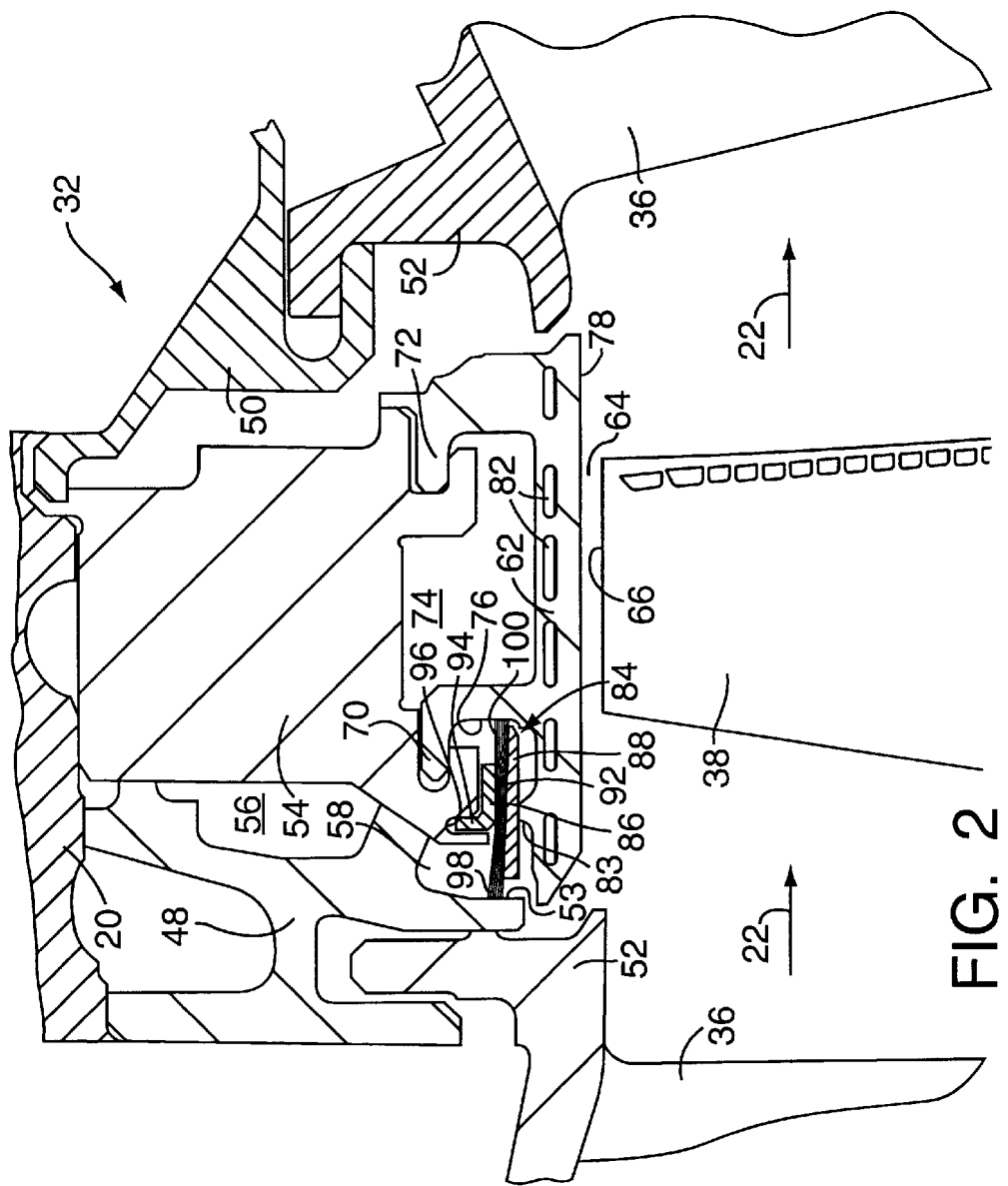
FIG. 2 is an enlarged, fragmentary cross-sectional view of a high pressure turbine section of the gas turbine engine of FIG. 1 with an axial brush seal positioned therein.

Referring to FIG. 2, the high pressure turbine section 32 of the gas turbine engine 10 includes substantially annular first and second vane supports 48, 50 secured to the engine case 20 for supporting vane platform portions 52 of the vanes 36. The first vane support 48 includes a vane support sealing surface 53. The high pressure turbine 32 also includes a substantially annular blade outer air seal support 54 secured to the engine case 20 and sandwiched between the first and second vane supports 48, 50. A first air cavity 56 and a second air cavity 58 are defined between the blade outer air seal support 54 and the vane support 48. The blade outer air seal support 54 supports a plurality of blade outer air seals 62 positioned radially outward of the rotating blades 38. The plurality of blade outer air seals 62 forms a segmented ring around the outer circumference of the air path 22 to define a running clearance 64 between the blade outer air seals 62 and blade tips 66 of the rotating blades 38.

Each blade outer air seal 62 includes blade outer air seal first and second tabs 70, 72 that fit into the blade outer air seal support 54, defining a third cooling air cavity 74 therebetween. Each blade outer air seal 62 also includes a blade outer air seal sealing surface 76 and a blade outer air seal clearance surface 78. Each of the blade outer air seals 62 further includes a plurality of blade outer air seal cooling openings 82 allowing cooling air from the third cooling air cavity 74 to pass through to cool the clearance surface 78 and a flange 83 protruding radially outward.

Figure 3:
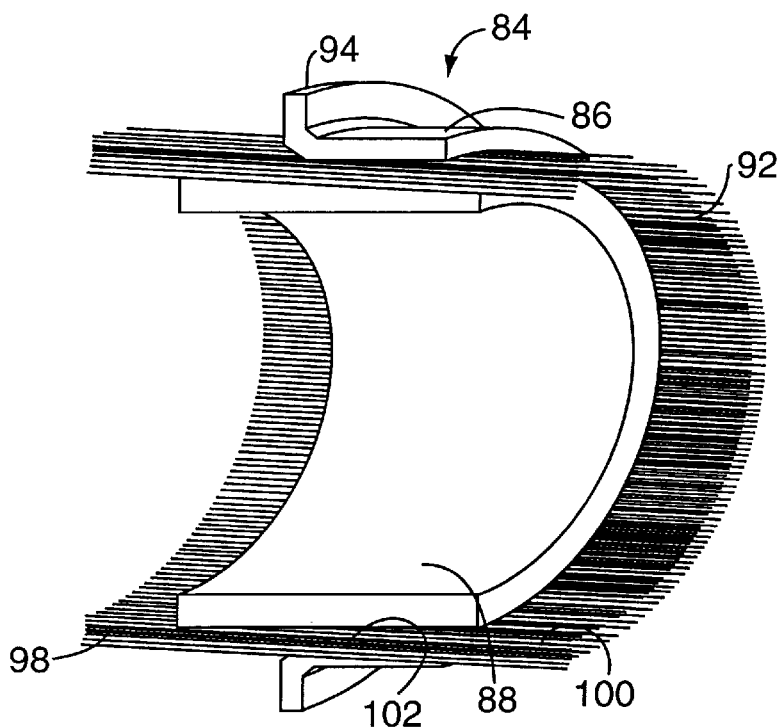
FIG. 3 is a partially broken away, perspective view of the axial brush seal of FIG. 2.
Figure 4:
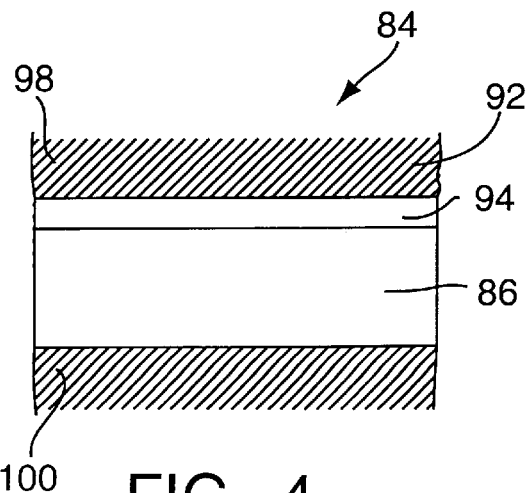
FIG. 4 is a fragmentary top view of the axial brush seal of FIG. 3.

The high pressure turbine 32 further includes an axial brush seal 84 extending axially between the sealing surface 53 of the vane support 48 and the sealing surfaces 76 of the blade outer air seals 62. The axial seal 84 is supported by the flanges 83 of the blade outer air seals 62. Referring to FIG. 3, the axial brush seal 84 includes a first seal ring 86 and a second seal ring 88 with a plurality of bristles 92 extending substantially axially therebetween. The first ring 86 includes an axial seal lip 94 protruding radially outward to fit into a blade outer air support groove 96, as best seen in FIG. 2. Each of the plurality of bristles 92 has a fore bristle end 98 and an aft bristle end 100. The first and second rings 86, 88 with a plurality of bristles 92 are welded together in the center thereof to form a substantially circumferential seam 102. In the preferred embodiment of the present invention, the pluralities of bristles 92 extend from the first and second rings 86, 88 at an angle, as shown in FIG. 4.

As the gas turbine engine 10 begins to operate, the pressure of the air flowing along the airpath 22 sequentially through the low and high compressor 26, 28 is increased, thereby effecting compression of the incoming airflow 22, as best seen in FIG. 1. A portion of the compressed air is bled and routed to the high pressure turbine 32. The remaining compressed air is mixed with fuel, ignited and burned in the combustor 14. The hot products of combustion emerge from the combustor 14 and enter the high turbine 32 at extremely high temperature and pressure. The turbine blades 38 expand the hot air, generating thrust and extracting energy to drive the compressor 12.

As the cooling air is directed from the high pressure compressor 28 and routed to the cooling air cavities 56, 58, 74, the axial brush seal 84 minimizes leakage of the cooling air from the cooling air cavities 56, 58, 74 into the air path 22. Initially, the bristles 92 of the axial seal 84 are compressed between the vane support 48 and the blade outer air seal 62 with the plurality of aft bristle tips 100 of the axial brush seal 84 being compressed against the blade outer air seal sealing surface 76 and the plurality of fore bristle tips 98 of the brush seal 84 being compressed against the vane support sealing surface 53. Some of the aft bristle tips 100 are slightly more compressed and some of the aft bristle tips 100 are slightly less compressed to compensate for lack of uniformity in size and manufacturing variations in the blade outer air seals 62.

As the extremely hot air passes through the air path 22 in the high pressure turbine 32, the rotating blades 38 experience thermal expansion. Also, as a result of centrifugal forces, the tips 66 of the rotating blades 38 move radially outward toward the blade outer air seals 62. In order to maintain the blade tip clearance 64 small throughout all operational phases of gas turbine engine 10, but to avoid interference between the blade tips 66 and blade outer air seals 62, the blade outer air seals 62 need to move radially outward as the blade tips 66 expand radially outward. The growth of the blade outer air seal support 54 and of the blade outer air seals 62 is precisely controlled by routing the cooling air into the cooling air cavities 56, 58, 74 and by metering out cooling air through the cooling openings 82 of the blade outer air seals 62.

Additionally, as the turbine section 32 begins to experience high temperatures, the vane support 48 moves radially and axially as the result of thermal expansion. The plurality of fore bristle tips 98 continues to be in contact with the vane support sealing surface 53, either further compressing or further expanding. Also, the axial seal 84 moves radially with the thermally growing or shrinking blade outer air seals 62 as the axial seal 84 rests on the flanges 83 of the blade outer air seals 62. The seal lip 94 allows some radial movement of the axial seal 84 and functions as a further air flow deterrent for axial air leakage. The seal lip 94 ensures proper placement of the axial seal 84 in the gas turbine engine 10. Thus, the axial brush seal 84, positioned between the vane support 48 and plurality of blade outer air seals 62, compensates for thermal expansion of adjacent components as well as for size and dimensional variations of the blade outer air seal segments 62.

One advantage of the present invention is that the axial seal 84 does not need to be bolted or otherwise fixedly secured, thereby reducing the cost of the seal and reducing assembly time during manufacturing. Also, placing bolts or rivets through the seal degrades the quality of the seal and results in loose bristles that tend to fall out from the seal, thereby reducing the seal's effectiveness.

In the preferred embodiment of the present invention, the bristles 92 extend from the seal rings 86, 88 at an angle, as shown in FIG. 4. The preferred angle is approximately forty-five degrees (45°). However bristles 92 can extend substantially perpendicular to the seal rings 86, 88 or form other angles therewith.

Although the preferred embodiment of the present invention describes the axial brush seal 84 having the seal lip 94, the seal lip 94 is not essential for certain applications where orientation of the axial seal 84 is not critical. A floating brush seal that is not fixedly attached to any components can also extend in the radial direction when air leaks in the axial direction.

Although use of brush seals in gas turbine engines has been disclosed in a U.S. Pat. No. 5,114,159 entitled "Brush Seal and Damper" to Baird et al. and assigned to an Assignee of the present invention, the patented brush seal and its' use are quite different from the axial seal 84 of the present invention. First, the patented brush seal is used in a compressor section, whereas the axial seal of the present invention is used in the turbine section, which experiences extreme temperature changes, resulting in significant thermal expansion and contraction of the turbine components. Second, the patented seal is fixedly attached, whereas the axial seal 84 of the present invention floats in both axial and radial directions to compensate for growth of engine components and for lack of uniformity thereof, thereby significantly increasing its effectiveness against air leakage.

While the present invention has been illustrated and described with respect to a particular embodiment thereof, it should be appreciated by those of ordinary skill in the art, that various modifications to this invention may be made without departing from the spirit and scope of the present invention.

I claim:

1. A gas turbine engine having a compressor, a combustor, and a turbine sequentially situated about a longitudinal axis, said gas turbine engine having working fluid flowing therethrough along an air path, said gas turbine engine comprising:
   a first component having a first sealing surface;
   a second component having a second sealing surface; and
   a floating brush seal positioned between said first component and said second component, said brush seal having a first ring and a second ring spaced apart from said first ring with a plurality of bristles sandwiched between said first ring and said second ring, said plurality of bristles having a first bristle end and a second bristle end, said first bristle end and said second bristle end of said plurality of bristles extending past said first and second rings, said first bristle end coming into contact with said first sealing surface of said first component and said second bristle end coming into contact with said second sealing surface of said second component, said brush seal being movable with respect to said first and second components.

2. The axial brush seal according to claim 1 further comprising:
   a seam formed between said first ring and said second ring and said plurality of bristles to secure said first and second rings and said plurality of bristles together.

3. The axial brush seal according to claim 1 wherein said first ring includes a seal lip extending radially outward therefrom for properly orienting said axial brush seal within said gas turbine engine.

4. The axial brush seal according to claim 1 wherein said plurality of bristles extends past said first and second ring at an angle.

5. The gas turbine engine according to claim 1 wherein said plurality of bristles of said brush seal is compressed different amounts to compensate for expansion and contraction of said first and second components and for lack of uniformity of at least one of said sealing surfaces.

6. A gas turbine engine having a compressor, a combustor, and a turbine sequentially situated about a longitudinal axis, said gas turbine engine having working fluid flowing therethrough along an air path, said compressor and said turbine of said gas turbine engine having a plurality of rows of rotating blades alternating with a plurality of rows of stationary vanes, each of said plurality of rows of rotating blades includes a plurality of rotating blades, each of said plurality of rotating blades includes a blade tip, said gas turbine engine comprising:
   a plurality of blade outer air seals forming a segmented ring and being positioned radially outward of said blade tips of said rotating blades to define a blade tip clearance therebetween;
   a blade outer air seal support disposed radially outward of said plurality of blade outer air seals and supporting each of said plurality of blade outer air seals, said blade outer air seal support being secured onto an engine case;
   a vane support attaching to said engine case and supporting a plurality of vanes therein, said vane support and said blade outer air seal support defining at least one cooling air cavity therebetween; and
   an axial brush seal positioned between said vane support and said plurality of blade outer air seals to minimize leakage of higher pressure cooler air from said cooling air cavity into said air path.

7. The gas turbine engine according to claim 6 wherein said axial brush seal comprises:
   a first ring extending axially;
   a second ring extending axially, said second ring being disposed radially inward of said first ring and spaced apart therefrom; and
   a plurality of bristles extending axially between said first ring and said second ring, said plurality of bristles having a first bristle end and a second bristle end, said first bristle end and said second bristle end of said plurality of bristles extending past said first and second rings.

8. The gas turbine engine according to claim 7 wherein said axial brush seal further comprises:
   a seam formed between said first ring and said second ring and said plurality of bristles to secure said first and second rings and said plurality of bristles together.

9. The gas turbine engine according to claim 7 wherein said first ring includes a seal lip extending radially outward therefrom for properly orienting said axial brush seal within said gas turbine engine.

10. The gas turbine engine according to claim 7 wherein said plurality of bristles extends past said first ring and second ring at an angle.

11. The gas turbine engine according to claim 7 wherein said first bristle end comes into contact with a vane support sealing surface of said vane support and said second bristle end comes into contact with a plurality of blade outer air seal sealing surfaces of said plurality of blade outer air seals with said plurality of bristles being compressed to compensate for expansion and contraction of said vane support and said plurality of blade outer air seals and for lack of uniformity of said plurality of blade outer air seals.

12. The gas turbine engine according to claim 6 wherein said axial brush seal is movable with respect to said plurality of blade outer air seals and said vane support.

13. The gas turbine engine according to claim 6 wherein said axial brush seal floats to compensate for growth of components of said gas turbine engine as a result of large temperature differentials and centrifugal forces.

14. The gas turbine engine according to claim 6 wherein said axial brush seal rests against a plurality of flanges, each of said plurality of flanges formed on each of said plurality of blade outer air seals.

15. A gas turbine engine having a compressor, a combustor, and a turbine sequentially situated about a longitudinal axis, said gas turbine engine having working fluid flowing therethrough along an air path, said compressor and said turbine of said gas turbine engine having a plurality of rows of rotating blades alternating with a plurality of rows of stationary vanes, each of said plurality of rows of rotating blades includes a plurality of rotating blades, each of said plurality of rotating blades includes a blade tip, said gas turbine engine comprising:

a plurality of blade outer air seals forming a segmented ring and being positioned radially outward of said blade tips of said rotating blades to define a blade tip clearance therebetween;

a blade outer air seal support disposed radially outward of said plurality of blade outer air seals and supporting each of said plurality of blade outer air seals, said blade outer air seal support being secured onto an engine case;

a vane support attaching to said engine case and supporting a plurality of vanes therein, said vane support and said blade outer air seal support defining at least one cooling air cavity therebetween; and a floating brush seal positioned between said vane support and said plurality of blade outer air seals, said brush seal having a first ring and a second ring spaced apart from said first ring with a plurality of bristles sandwiched between said first ring and said second ring, each of said plurality of bristles having a first bristle end and a second bristle end, said first bristle end and said second bristle end of each of said plurality of bristles extending past said first and second rings, said first bristle ends coming into contact with said vane support and said second bristle ends coming into contact with said plurality of blade outer air seals, said brush seal being movable with respect to said vane support and said plurality of blade outer air seals to minimize leakage of higher pressure cooler air from said cooling air cavity into said air path.

16. The gas turbine engine according to claim 15 wherein said brush seal floats by having said plurality of bristles compress to compensate for expansion and contraction of said vane support and said plurality of blade outer air seals and for lack of uniformity of said plurality of blade outer air seals.

17. The gas turbine engine according to claim 15 wherein said brush seal rests against a plurality of flanges, each of said plurality of flanges formed on each of said plurality of blade outer air seals.

* * * * *